US008667193B2

(12) United States Patent
Gruber et al.

(10) Patent No.: US 8,667,193 B2
(45) Date of Patent: Mar. 4, 2014

(54) NON-PORTED GENERIC DEVICE (SOFTWARE MANAGED GENERIC DEVICE)

(75) Inventors: Hans Georg Gruber, San Diego, CA (US); Julio Arceo, San Diego, CA (US); Magesh Hariharan, San Diego, CA (US); Suren Mohan, San Diego, CA (US); Mark A. Landguth, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 13/281,329

(22) Filed: Oct. 25, 2011

(65) Prior Publication Data

US 2012/0278518 A1 Nov. 1, 2012

Related U.S. Application Data (60) Provisional application No. 61/481,047, filed on Apr. 29, 2011.

(51) Int. Cl.
*G06F 13/42* (2006.01)

(52) U.S. Cl.
USPC .......................................... 710/105; 711/147

(58) Field of Classification Search
USPC ............. 710/100, 300, 105, 33, 22, 305–306, 710/308; 711/147, 149; 709/208
See application file for complete search history.

(56) References Cited

U.S. PATENT DOCUMENTS

| 3,729,586 | A | | 4/1973 | Chow |
|---|---|---|---|---|
| 5,369,749 | A | | 11/1994 | Baker et al. |
| 5,903,775 | A | * | 5/1999 | Murray ............................ 710/33 |
| 6,094,700 | A | | 7/2000 | Deschepper et al. |
| 7,200,692 | B2 | * | 4/2007 | Singla et al. ..................... 710/22 |
| 7,752,374 | B2 | * | 7/2010 | Cassidy ......................... 710/308 |
| 7,848,232 | B2 | | 12/2010 | Loffink et al. |
| 7,849,245 | B2 | | 12/2010 | Travis |
| 7,903,642 | B2 | * | 3/2011 | Voutilainen et al. ........... 370/354 |
| 2002/0091826 | A1 | | 7/2002 | Comeau et al. |
| 2004/0225805 | A1 | | 11/2004 | Vasudevan |
| 2005/0027904 | A1 | | 2/2005 | Khawand et al. |
| 2005/0080944 | A1 | | 4/2005 | Tomitsuka et al. |
| 2006/0179145 | A1 | | 8/2006 | Khawand |
| 2010/0191995 | A1 | | 7/2010 | Levy et al. |
| 2011/0007680 | A1 | | 1/2011 | Kadous et al. |
| 2011/0280204 | A1 | | 11/2011 | Nourbakhsh et al. |
| 2012/0278646 | A1 | | 11/2012 | Gruber et al. |
| 2013/0019038 | A1 | | 1/2013 | Gruber et al. |

FOREIGN PATENT DOCUMENTS

WO 2010055347 A1 5/2010

OTHER PUBLICATIONS

International Search Report and Written Opinion—PCT/US2012/035446—ISA/EPO—Jul. 25, 2012.
Juha B., et al.,"Slimbus: An Audio, Data and Control Interface for Mobile Devices" Conference: 29th International Conference: Audio for Mobile and Handheld Devices; Sep. 2006, AES, 60 East 42nd Street, Room 2520 New York 10165-2520, USA, Sep. 1, 2006, XP040507958 Section 2.6.

* cited by examiner

*Primary Examiner* — Clifford Knoll
(74) *Attorney, Agent, or Firm* — Howard Seo (57) ABSTRACT Techniques are disclosed for utilizing a non-ported generic device (NGD) or other non-ported hardware to couple processing device(s) to access components on a serial data bus without the need for integrated manager hardware. Using the NGD, a processing device(s) can utilize available unused bandwidth on the serial data bus to communicate with components coupled with the serial data bus, including a processing device having the manager hardware. Various alterations and embodiments are disclosed.

48 Claims, 6 Drawing Sheets

NON-PORTED GENERIC DEVICE (SOFTWARE MANAGED GENERIC DEVICE)

CROSS-REFERENCES TO RELATED APPLICATIONS

This application claims priority to U.S. Provisional Patent Application No. 61/481,047, filed Apr. 29, 2011, entitled "IN NON-PORTED GENERIC DEVICE (SOFTWARE MANAGED GENERIC DEVICE,", the entirety of which is hereby incorporated by reference for all purposes.

BACKGROUND

A serial data bus, such as a Serial Low-power Inter-chip Media bus (SLIMbus) may be used in a mobile device (e.g., mobile phone, tablet, or other personal electronic device) such that audio, data, bus, and device control may occur on a single data bus. Components on the data bus are associated with one or more "ports," having logical addresses of the bus utilized for access to a data channel on the data bus. A processing device can utilize manager hardware to boot the data bus and perform data bus administration, such as setting up data channels between ports. This setup, however, limits the ability for other processing devices to communicate with components on the data bus.

SUMMARY

Embodiments of the invention provide for a system that can utilize a non-ported generic device (NGD) or other non-ported hardware to couple processing device(s) to the serial data bus without the need for integrated manager hardware. Using the NGD, the processing device(s) can utilize available unused bandwidth on the serial data bus to communicate with components coupled with the serial data bus, including a processing device having the manager hardware.

A first example system, according to the disclosure, includes a data bus configured to provide data communication through a plurality of ports, and message capabilities. The system further includes a manager coupled with the data bus and configured to manage the data bus, a first processing device coupled with the manager, a second processing device, and a communication device coupled with the second processing device and the data bus. The communication device does not include a port of the data bus, and the communication device is configured to communicate information, from the second processing device, using the message capabilities of the data bus.

The first example system can include one or more of the following additional features. The communication device is configured to communicate with the first processing device using the message capabilities of the data bus. At least one component coupled with the data bus. The communication device is configured to communicate with the at least one component using the message capabilities of the data bus. The communication device is configured write to a register of the at least one component using the message capabilities of the data bus. The communication device is configured read from a register of the at least one component using the message capabilities of the data bus. The communication device is configured to communicate a request for a data channel to the manager using the message capabilities of the data bus. The data bus comprises a SLIMbus. The communication device comprises a non-ported generic device. The communication device comprises a first communication device, the system further comprising a second communication device coupled between the data bus and a third processing device. The second communication device is configured to communicate information, from the third processing device, using the message capabilities of the data bus.

A first example method, according to the disclosure, includes receiving a request that requires access to a component coupled with a data bus, determining the access to the data bus requires allocation of a data channel of the data bus, and communicating, with a communication device not having a port on the data bus, a first set of data. The first set of data is communicated using messaging capabilities of the data bus. The method further includes allocating the data channel of the data bus, and communicating a second set of data to the component. The second set of data is communicated using the data channel of the data bus.

The first example method can include one or more of the following additional features. The data bus comprises a SLIMbus. The first set of data includes data indicative of an identity of the component. The first set of data includes data indicative of a requested bandwidth. Receiving, from the component, a third set of data wherein the third set of data is communicated using the data channel of the data bus. Communicating the third set of data to a requesting entity. Communicating an acknowledgement to a requesting entity. The communication device is a non-ported generic device.

A second example method, according to the disclosure, includes receiving a request from a requesting entity. The request requires access to a component coupled with a data bus. The method further includes communicating, with a communication device not having a port on the data bus, a first set of data to the component. The first set of data is communicated using messaging capabilities of the data bus. The method also includes receiving, with the communication device, a second set of data from the component, and communicating a message to the requesting entity. The message is based, at least in part, on the second set of data.

The second example method can include one or more of the following additional features. The first set of data includes information indicative of a value to write to a register of the component. The second set of data includes information indicative of a value of a register of the component. The communication device comprises a non-ported generic device.

A second example system, according to the disclosure, can include a data bus configured to provide data communication through a plurality of ports, and message capabilities. The system also includes a manager coupled with the data bus and configured to manage the data bus, a first processing device coupled with a first communication device, and a second processing device coupled with a second communication device. The first communication device and the second communication device are coupled with the data bus. The first communication device and the second communication device do not include a port of the data bus. The first communication device is configured to communicate information from the first processing device, using the message capabilities of the data bus, to the second processing device via the second communication device.

The second example system can include one or more of the following additional features. At least one component coupled with the data bus configured to receive data from the first communication device using the message capabilities of the data bus. The first communication device is configured write to a register of the at least one component using the message capabilities of the data bus. The first communication device is configured read from a register of the at least one component using the message capabilities of the data bus. The first communication device is configured to communicate a request for a data channel to the manager using the message capabilities of the data bus. The first communication device and the second communication device are a non-ported generic devices.

An example apparatus, according to the disclosure, includes means for receiving a request that requires access to a component coupled with a data bus, means for determining the access to the data bus requires allocation of a data channel of the data bus, and means for communicating, with a communication device not having a port on the data bus, a first set of data. The first set of data is communicated using messaging capabilities of the data bus. The apparatus further includes means for allocating the data channel of the data bus, and means for communicating a second set of data to the component. The second set of data is communicated using the data channel of the data bus.

The example apparatus can include one or more of the following additional features. The data bus comprises a SLIMbus. The means for communicating is configured to include data indicative of an identity of the component in the first set of data. The means for communicating is configured to include data indicative of a requested bandwidth in the first set of data. Means for receiving, from the component, a third set of data, where the third set of data is communicated using the data channel of the data bus. Means for communicating the third set of data to a requesting entity. Means for communicating an acknowledgement to a requesting entity. The communication device comprises a non-ported generic device.

An first example non-transitory computer-readable medium, according to the disclosure, includes instructions configured to cause a processor to receive a request that requires access to a component coupled with a data bus, determine the access to the data bus requires allocation of a data channel of the data bus, and communicate, with a communication device not having a port on the data bus, a first set of data. The first set of data is communicated using messaging capabilities of the data bus. The instructions are also configured to cause the processor to allocate the data channel of the data bus, and communicate a second set of data to the component. The second set of data is communicated using the data channel of the data bus.

The first example non-transitory computer-readable medium can include one or more of the following additional features. The data bus comprises a SLIMbus. The instructions are configured to cause the processor to include data indicative of an identity of the component in the first set of data. The instructions also are configured to cause the processor to include data indicative of a requested bandwidth in the first set of data. Instructions configured to cause the processor to be able to receive, from the component via the data channel of the data bus, a third set of data. Instructions configured to cause the processor to communicate the third set of data to a requesting entity. Instructions configured to cause the processor to communicate an acknowledgement to a requesting entity. The communication device is a non-ported generic device.

A second non-transitory computer-readable medium, according to the disclosure, includes instructions configured to cause a processor to receive a request from a requesting entity. The request requires access to a component coupled with a data bus. The instructions also are configured to cause the processor to communicate, with a communication device not having a port on the data bus, a first set of data to the component, wherein the first set of data is communicated using messaging capabilities of the data bus, receive, with the communication device, a second set of data from the component, and communicate, a message to the requesting entity. The message is based, at least in part, on the second set of data.

The second example non-transitory computer-readable medium can include one or more of the following additional features. The instructions are configured to cause the processor to include, in the first set of data, information indicative of a value to write to a register of the component. The instructions are configured to cause the processor to determine, from the second set of data, information indicative of a value of a register of the component. The communication device comprises a non-ported generic device.

Numerous benefits are achieved by way of the present invention over conventional techniques. For example, there is no need for redundant manager hardware in additional processing devices, thereby simplifying hardware and reducing costs. Additionally, the use of NGDs allow the additional processing devices to communicate on the serial data bus without forcing the processing device with the manager hardware to act as a "middleman," relaying communications from the additional processing devices to the serial data bus. Furthermore, because the NGD can utilize otherwise unused bandwidth on the serial data bus, overall efficiency of the serial data bus is increased. These and other embodiments of the invention, along with many of its advantages and features, are described in more detail in conjunction with the text below and attached figures.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

A serial data bus, such as a Serial Low-power Inter-chip Media bus (SLIMbus) can include manager hardware to perform various administrative functions for the data bus, such as booting up the data bus, allocating data channels, and more. This manager hardware can be incorporated into a processing device (e.g., central processing unit (CPU), microcontroller (MCU), digital signal processor (DSP), application-specific integrated circuit (ASIC), or other processing means), enabling, among other things, the processing device to communicate with various components on the serial data bus.

Difficulties can arise, however, when attempting to allow a second processing device to communicate with components on the data bus. This typically is done using one of two methods. In the first method, the second processing device communicates to the component through the first processing device (with the manager hardware) via a communication link between the first and second processing devices. Problematically, the first processing device acts as a "middleman" to relay the data, which can use up processing power and bandwidth of the first processor. In the second method, the second processing device simply can take over as manager of the data bus. In this case, however, the second processing device would need its own manager hardware connected with the data bus. This can increase costs for the system, especially in system having several processing devices enabled to communicate to components on the data bus.

Embodiments of the invention described herein provide for an improved system that can utilize a non-ported generic device (NGD) or other non-ported hardware to couple the second processing device to the data bus. To be clear, "non-ported" device, or device "not having a port" as described herein is a device that does not have a logical port on the data bus and therefore does not have the capabilities of accessing a data channel of the data bus. The NGD has no ports and does not include the functionality of manager hardware, which simplifies hardware and reduces costs. Using the NGD, the second processing device can utilize available unused bandwidth on the data bus (e.g., a messaging channel) to communicate with components, including the first processing device, coupled with the data bus.

Enabling the second processing device to communicate in this manner can provide new functionality to the data bus. The second processing device can read and/or write directly to registers on components coupled with the data bus. Additionally, the second processing device can have separate data transfer hardware with a port that can utilize a data channel on the data bus. In this case, the second processing device can use the NGD to communicate to the first processing device a request to setup a data channel on the data bus, and the first processing device can setup the requested data channel using the manager hardware. This allows the second processing device to transfer data on the data bus using a data channel. Furthermore, NGDs may be used by many processing devices, enabling three or more processing devices to communicate on the data bus.

Data buses are discussed throughout the disclosure. The examples that follow focus on the use of a SLIMbus serial data bus. It should be understood, however, that similar principles may be applied to other forms of data buses.

Figure 1:
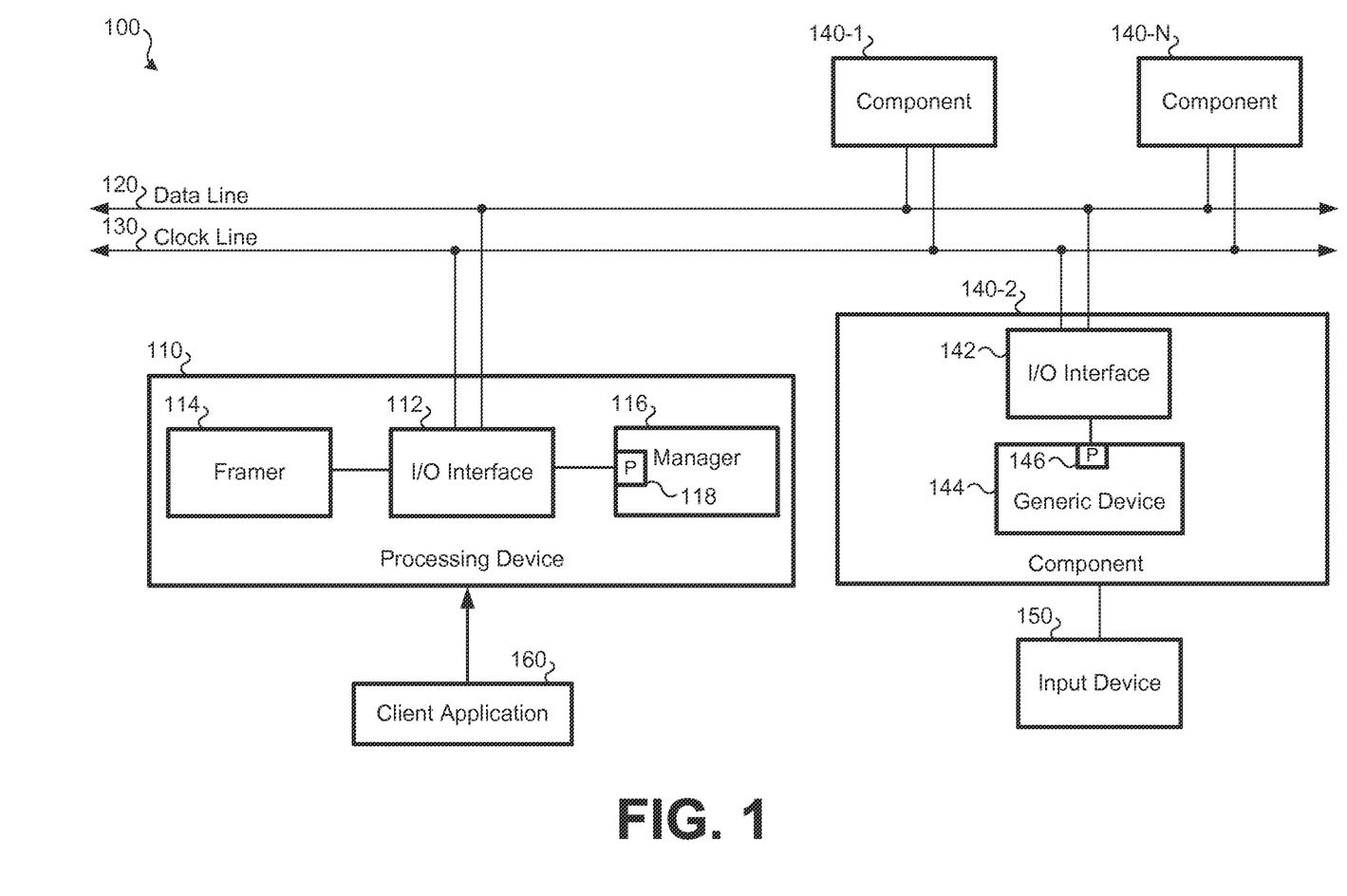
FIG. 1 is a simplified block diagram of an example system with data bus architecture.

FIG. 1 illustrates a simplified block diagram of an example system 100 that includes a data bus, such as a Serial Low-power Inter-chip Media bus (SLIMbus). Such a data bus may be used in a mobile device such that audio, data, bus, and/or device control may occur on a single data bus. Such a data bus may allow for multiple audio and/or data channels to use the same data bus. Further, in some embodiments, different sample rates for different audio channels may be supported at the same time. The system 100 includes processing device 110 (which includes I/O interface 112, framer 114, and manager 116), data line 120, clock line 130, and components 140.

The processing device 110 may be a central processing unit (CPU), a digital signal processor (DSP), a state machine, a microcontroller (MCU) or other controller, application-specific integrated circuit (ASIC), a state machine, a lookup table, etc. For purposes of power optimization or other factors, a system may utilize multiple processing devices 110. The processing device 110 may manage a data bus that comprises data line 120 and clock line 130. In some embodiments, the data bus is a SLIMbus. The processing device 110 may include an I/O interface 112. The I/O interface 112 may provide management services for the data bus, control a frame layer of the bus, monitor message protocols implemented using the processing device 110, and/or manage resets of the processing device 110. The processing device 110 may store and/or access instructions, which can be contained on any of various forms of non-transitory computer-readable media. These instructions may be executed by the processor and may cause the processor to perform various functions. For example, various steps of methods described herein may be stored as instructions and performed by the processing device 110.

The framer 114 of the processing device 110 may serve as the source for the clock signal driven on the clock line 130. As such, the clock signal provided by the framer 114 may be provided to all devices and components 140 connected with the clock line 130. The framer 114 may have the ability to enter multiple clock modes, such as an active clock mode and a paused clock mode. When in the active clock mode, the framer 114 can supply an active clock signal to the clock line 130. When in the active clock mode, frames of data may be transmitted by the processing device 110 and/or the components 140 via the data bus. In the paused clock mode, the framer 114 may hold the clock line 130 in a single steady state (such that the logical value of the clock line 130 does not change). In the paused clock mode, the clock line 130 may be held to a logical value of one. While in the paused clock mode, frames of data may not be transmitted using the data bus. The framer 114 may also transmit guide and framing channels, collectively referred to as "framing information," on the data line 120 to the other components 140 connected with the data bus. This framing information may be used to establish a time division multiplexed (TDM) frame structure of the bus and/or to communicate such information to other devices and components 140 connected with the bus for establishing synchronization.

The manager 116 may be responsible for booting the data bus and performing data bus administration. Bus administration may include enumeration of devices and components 140 connected with the bus, bus configuration, and/or dynamic channel allocation. The manager also may include a port 118, or logical address, on the bus to help enable the manager to perform the data bus administration. If multiple managers are connected with the data bus, only one manager may be permitted to be active at a given time. While the I/O interface 112, framer 114, and manager 116 are illustrated as part of (or as being executed by) the processing device 110, some embodiments provide for some or all of these components to be separate components individually connected with the data bus. For example, while in the system 100, the manager 116 is present in the same processing device 110 as the framer 114, the manager 116 and the framer 114 may be in separate physical components connected with the data bus in some embodiments.

FIG. 1 illustrates three components 140-1, 140-2,140-N connected with data line 120 and clock line 130. Here, "component" is a general term for a device that is connected with the data bus. Components 140 typically provide various application functionality, such as analog to digital conversion (ADC) or digital to analog conversion (DAC). As an example, a component, such as component 140-1, may be a generic processor, such as a CPU or DSP that is connected with a microphone. When information is received by the generic processor from the microphone, it may be digitized, analyzed, and, if the data is to be transmitted to one or more other devices and/or components 140 connected with the data bus, transmitted using the data bus. While the illustrated embodiment of system 100 illustrates three component 140, it should be understood that greater or fewer components may be connected with the data bus.

For simplicity, additional detail has been shown in component 140-2 only. Components 140 may contain various sub-components, such as an I/O interface 142 and generic device 144. Such sub-components may permit the component 140-2 to communicate via the data bus and receive and analyze data from some other device, respectively. For example the generic device 144 may allow data to be exchanged (e.g., transmitted and/or received) with a device such as the input device 150. The generic device may include a port 146, or logical address on the data bus, to help enable the data exchange. Similar details may be present in components 140-1 and 140-N.

Components 140 and processing devices 110 may be associated with one or more ports 118, 146 that are merged onto the bus. Any number (e.g., 32, 64, etc.) of ports can be utilized on each device, as dictated by the standards of the data bus. Ports are logical addresses of the bus (having corresponding physical connections to the data bus), utilized for access to a data channel associated with the data bus. Put another way, a port is a logical end to a data channel, and a data channel can be setup between two ports that can be dynamically and logically connected with the data channel. The ports provide a mechanism by which communication can be coordinated on a data bus via, for example, TDM. For instance, different TDM time slots can be are allocated for various ports at various times time. Such time slots can be uniform or non-uniform. Further, depending on whether a given port is a source or destination at a given time, the time slots provide for either sourcing or sampling of data from the corresponding data bus. Finally, as discussed in further detail below, some devices may be connected with the data bus, but have no corresponding logical address, and therefore no port. Such non-ported devices can be configured to communicate on message channels of the data bus.

Although the I/O interfaces 112 and 142 shown in FIG. 1 are shown to be associated with ported devices, the I/O interfaces 112 and 142 may associate with any number of generic devices, NGDs, or ports, including zero devices and/or ports. In the event that the I/O interface 112 or 142 is associated with no devices or ports, the framer 114 associated with the data bus may nonetheless continue to provide a clock signal to the bus components.

A data bus as illustrated in FIG. 1, such as a SLIMbus, may operate using a multi-drop bus topology where bus signals are common to all components on the bus. To prevent interference between components on the bus, the data bus is configured such that only one transmitter device communicates on the bus at any given time. This constraint may be enforced through an arbitration procedure and/or other collision avoidance mechanisms.

While the above description provides a basic primer on how devices and components 140 on a data bus (such as a SLIMbus) may communicate, it should be understood that additional components may be present that, for simplicity, are not illustrated. For example, the processing device 110 and a component 140 may have one or more message buffers to buffer data that is to be transmitted using the data bus and/or to buffer data that is being received via the data bus. Additional information may be found in the specification for the specific form of data bus being used. For example, Version 1.01 of the SLIMbus specification, published by the Mobile Industry Processor Interface (MIPI) Alliance, provides additional information regarding the implementation of SLIMbus systems.

The data bus of the system 100 uses a synchronous, two-wire bus to distribute data between components connected with the clock line and data line. As discussed above, the data bus can utilize a TDM scheme to allow multiple receiving and transmitting devices to utilize and communicate through the data bus. Here, the organization of data as distributed in time using the data bus is referred to as the "frame structure." The frame structure of the data bus, if a SLIMbus, may have five subparts: cells, slots, frames, subframes, and superframes. A "cell" refers to the smallest subdivision of data transported using the data bus. A cell is bounded by two consecutive positive boundaries and holds a single bit of information. A "slot" refers to four contiguous cells. A slot, therefore, contains four bits of information. The bits are from most significant bit to least significant bit (e.g., the most significant bit is on the left). A "frame" is defined as 192 contiguous slots. The first slot of a frame is a control space slot that contains a four bit frame synchronization symbol (also referred to as frame sync data). This frame sync symbol is represented by the binary sequence "1011." Similarly, slot 96 of each frame may also be a control space slot that contains four bits of framing information. The frame sync data and thirty-two bits of framing information are used to synchronize the bus. To receive all thirty-two bits of framing information, data may be read from slot 96 of eight successive frames. These eight successive frames are referred to as a "superframe." As such, eight contiguous frames comprise a single superframe.

If synchronization is lost by a device connected with the data bus, a superframe may not be able to be read by the device. Referring to SLIMbus, an amount of tolerance has been designed in such that, if a single frame-sync slot is not as expected, the data of the superframe may still be read properly. However, if a second consecutive frame sync slot is in error, then data in the superframe shall not be read by the device.

A "subframe" is defined as a division of the frame structure at which control space and data space are interleaved. Regardless, the first slot is allocated to control space. Subframes may not have a single, fixed length. Rather, subframe length may be varied among various, predefined lengths. Referring to SLIMbus, the length may be programmable to 6, 8, 24, or 32 contiguous slots (i.e., 24, 32, 96, or 128 cells). In SLIMbus, the subframe configuration may be dynamically varied based on factors such as the data flow requirements of applications being supported by the SLIMbus at the time.

With this topology, a client application 160 can gain access to any component 140 on the data bus through the processing device 110. The client application 160 can include any of a variety of functions, such as music playback, audio recording, data transfer, and/or more, that might require access to one or more components 140 connected with the bus. For example, if the client application 160 is an audio recording application and the input device 150 is a microphone, the client application 160 can access the input device 150 by communicating the need to access the input device 150 to the processing device 110. The processing device, using the manager 116, arranges for a data channel to be setup on the data bus for access to the input device 150 and communicates the request to component 140-2 in accordance with the specifications of the data bus. After receiving the request from the processing device 110, the component 140-2 can receive an analog audio input from the input device 150 and convert it to a digital format using generic device 144, which can be an ADC. Once in a digital format, the component 140 can communicate the data from the input device through the data bus back to the processing device 110 using the I/O interface 142. Finally, the processing device 110 can then provide the data to the client application 160. Thus, the client application 160 gains access to bus components 140 through the processing device 110.

Figure 2:
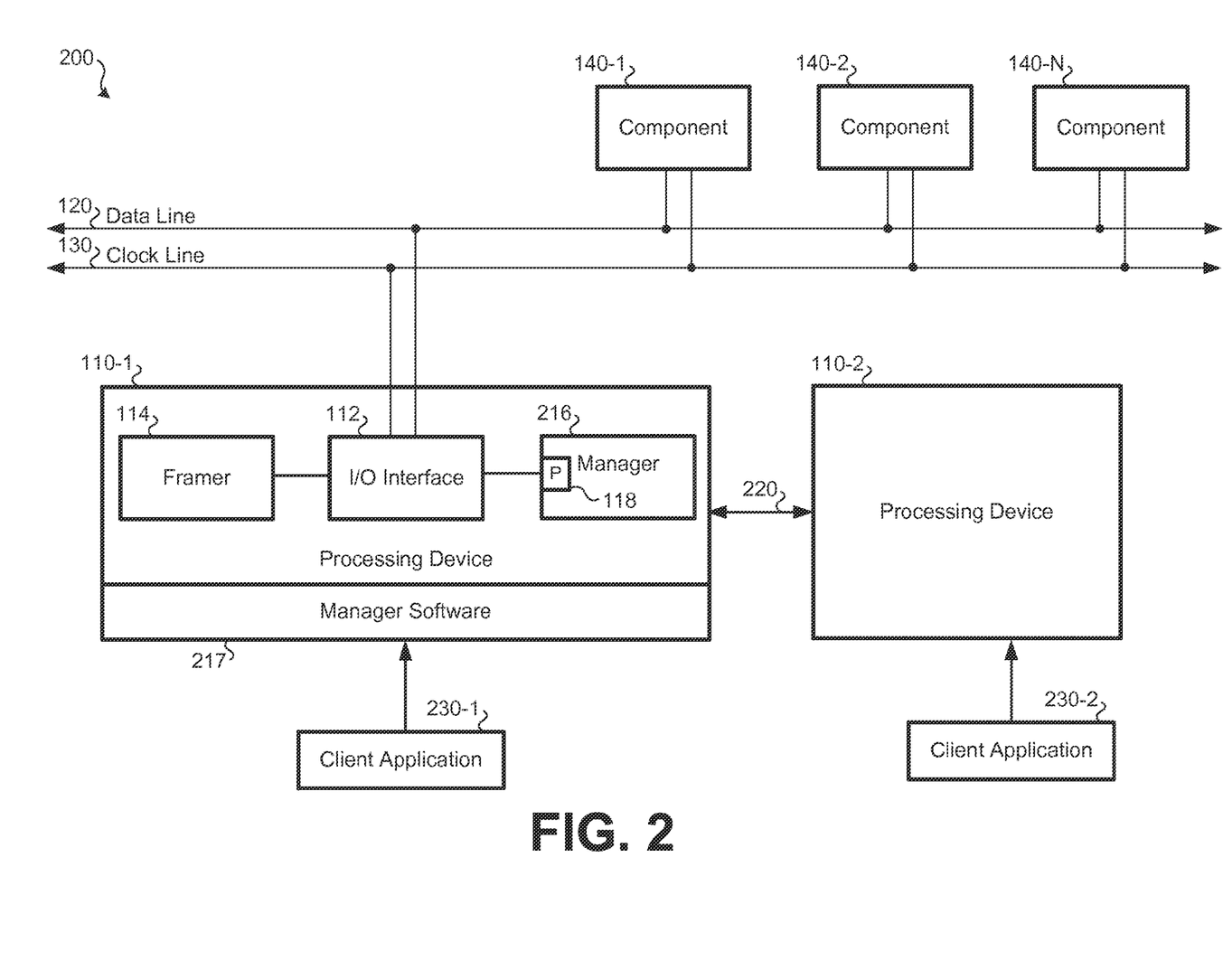
FIG. 2 is a graphical illustration of an example system for providing access to bus components to a processing device not connected with the data bus.

FIG. 2 illustrates an example system 200 for providing access to bus components 140 to a second processing device 110-2 not connected with the data bus. Multiple processing devices 110 may be utilized in systems for purposes of power optimization or other factors. In this configuration, a first processing device 110-1 is connected with the data bus, and a second processing device 110-2 is connected with the first processing device 110-1 through a separate communication link 220. The processing devices 110 can conduct inter-processor communication (IPC) through this communication link 220 using interfaces such as High Speed Inter-Chip (HSIC), High-speed Synchronous Serial Interface (HSI), Serial Peripheral Interface (SPI), PCI Express (PCIe), and/or other means.

In this system 200, all data and communication between the second processing device 110-2 and the data bus necessarily flows through the communication link 220, where the first processing device 110-1 relays the information to the data bus. In FIG. 2, hardware and software components of the manager 116 of the processing device 110 of FIG. 1 are represented as separate components: manager hardware 216 and manager software 217. The manager hardware 216 may be physically separate from or physically incorporated into the first processing device 110-1. The manager software 217 can be, for example, a driver running on the first processing device 110-1 to conduct the managerial duties of the data bus through the manager hardware 216. Client applications 230 and a second processing device 110-2 can communicate with the manager software 217 to perform certain functions that require access to the data bus.

Although the communication link 220 enables the second processing device 110-2 to access the data bus, it requires the first processing device 110-1 to act as a "middleman," relaying data from the second processing device 110-2 to the data bus. For example, if a client application 230-2 with access to the second processing device 110-2 wants to access a component 140 on the data bus, the client application 230-2 must cause the second processing device 110-2 to make a request to the manager software 217 of the first processing device 110-1 to setup a data channel on the data bus in order to send and receive data to and from the component 140. All data is then relayed through the first processing device 110-1 to the second processing device 110-2 via the communication link 220. Moreover, even in situations where a data channel may not need to be set up, such as messaging and/or controlling registers of a component 140, the second processing device 110-2 must still relay information through the first processing device 110-1.

In an alternative configuration (not shown), the second processing device 110-2 may be connected to the data bus directly. According to conventional methods, however, the second processing device 110-2 would include manager software 217 and manager hardware 216, duplicating the corresponding elements in the first processing device 110-1. In such a configuration, if the client application 230-2 with access to the second processing device 110-2 wants to communicate with a component 140 on the data bus, the second processing device 110-2 can assume the responsibilities of managing the data bus. Depending on the type of data bus involved, certain procedures would need to be carried out in order to pass these responsibilities would from the first processing device 110-1 to the second processing device 110-2.

Figure 3:
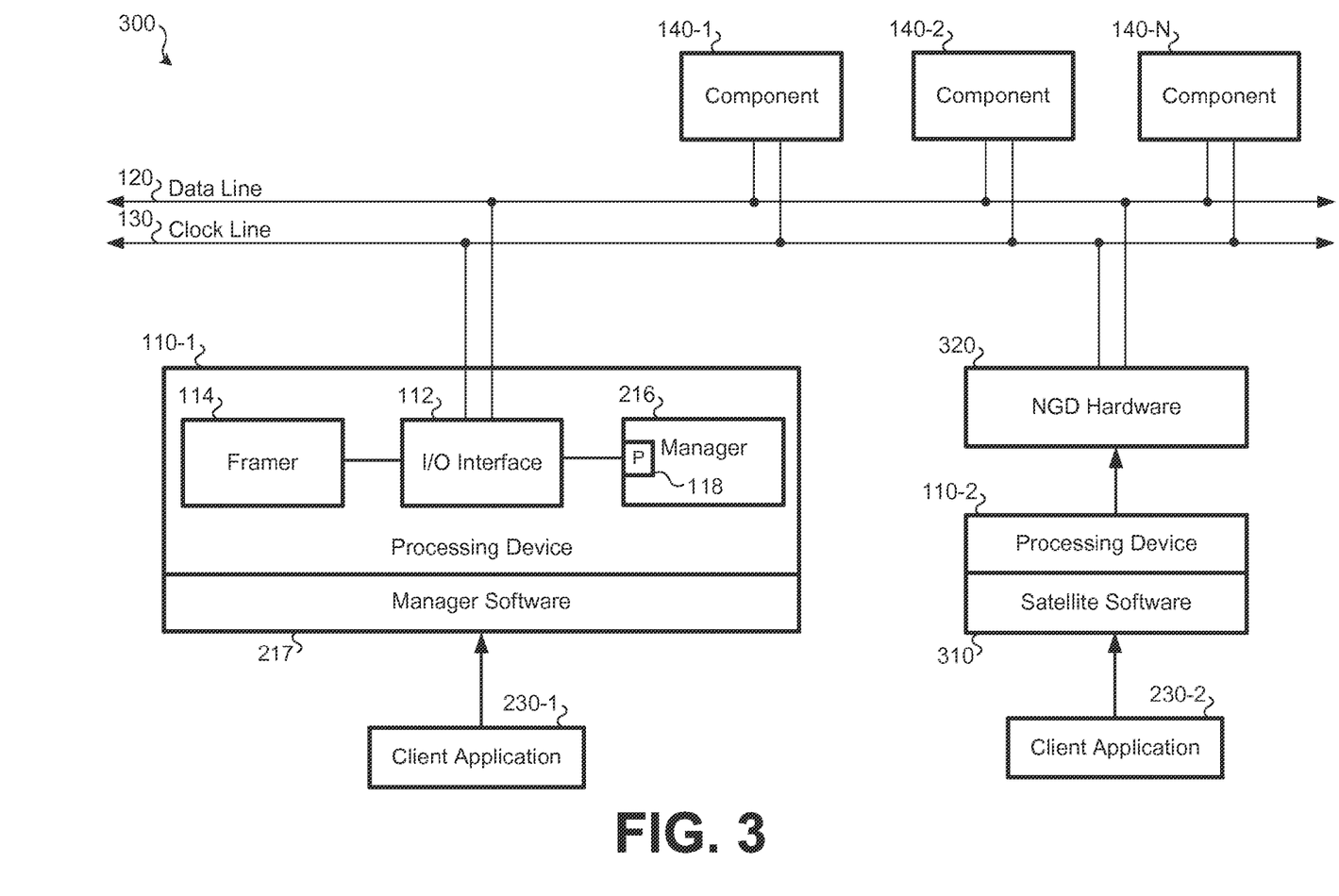
FIG. 3 is a graphical illustration of an embodiment of a data bus architecture having a processing device coupled with Non-Ported Generic Device (NGD) hardware, according to one embodiment of the invention.

FIG. 3. illustrates an improved system 300 for providing access to bus components 140 to a second processing device 110-2, according to one embodiment. In this system 300, the second processing device 110-2 can communicate with the data bus and/or first processing device 110-1 via a device having no ports, thereby simplifying hardware, which may include a generic device without special functions of the Framer 114 or the Manager 116 to simplify further. Such a device may include a Non-Ported Generic Device (NGD) hardware 320 connected to the data bus rather than through a communication link between the processing devices 110. Such a configuration improves efficiency by enabling the second processing device 110-2 to access the data bus without having to relay information through the first processing device. It also utilizes NGD hardware 320 that can be simpler and cheaper than standard manager hardware 216.

In this system 300, the second processing device can include satellite software 310. The satellite software 310 can be a driver or other program that controls the NGD hardware 320 in a similar manner as the manager software 217 controls the manager hardware 216. However, the satellite software 310 can be much simpler than the manager software 217, depending on desired functionality, because it may not need many of the management functions of the manager software 217. Consequently, the satellite software 310 can be smaller and require less processing resources than the manager software 217.

Similarly, because the NGD hardware 320 does not need to—and indeed may not be able to—perform the functions required by the manager hardware 216, the NGD hardware 320 can be much simpler than the manager hardware 216. Because the NGD hardware 320 is "non-ported" on the data bus, it may not have an allocated port on the data bus for access to data channels. However, the NGD hardware 320 can enable the second processing device 110-2 to communicate with the first processing device 110-1 and other components 140 on the data bus using available unused bandwidth on the data bus. For example, a SLIMbus has messaging capabilities (e.g., a messaging channel), distinct from any data channels, that can enable the second processing device 110-2 to send messages on the SLIMbus through the NGD hardware 320. The NGD hardware 320, therefore, may need only basic messaging capabilities over the data bus to provide the second processing device 110-2 sufficient access to the data bus. Although the NGD hardware 320 a may not have an allocated port on the data bus for access to data channels, its messaging capabilities may include an address for access to data via messaging channels.

By utilizing the data bus, the second processing device 110-2 can communicate with the first processing device 110-1 without the need for a separate communication link between the two processing devices 110. For example, IPC information between the processing devices 110 can be exchanged by implementing certain protocols on the messaging capabilities of the data bus. Examples of such techniques are described in U.S. Pat. App. No. 61/471,106, filed on Apr. 2, 2011, entitled "METHOD FOR CONCURRENT SLIM- BUS ACCESS FROM MULTIPLE SOFTWARE CONTEXTS," which is hereby incorporated by reference in its entirety.

By enabling the second processing device 110-2 to communicate directly with the data bus through the NGD hardware 320, communications from the second processing device 110-2 to other components and/or devices (including processing devices that may not have framer and/or manager capabilities) on the data bus no longer need to be relayed by the first processing device 110-1. This can help save bandwidth and processing power. For example, the second processing device 110-2 can use the NGD hardware 320 to indicate to the first processing device 110-1, using a messaging channel on the data bus, that it needs a data channel set up on the data bus to communicate with a particular component 140. After the first processing device 110-1 creates the requested data channel using manager software 217 and manager hardware 216, the second processing device 110-2 is then free to communicate with the corresponding component 140 directly through the data bus. There is no continued need for the first processing device 110-1 to relay any additional information. Because the NGD hardware 320 may not have data transfer capabilities, the second processing device 110-2 may communicate over the data channel by utilizing separate data transfer hardware (not shown) communicatively linked to the data bus.

In instances where the manager software 217 and/or manager hardware 216 are not required to setup a data channel or perform similar management functions, the first processing device 110-1 may not be needed to enable the second processing device 110-2 to communicate with components 140. For example, in an embodiment utilizing SLIMbus, the second processing device 110-2 can command and/or control registers of components 140 directly, through the NGD hardware 320, using SLIMbus messaging. Such capabilities sidestep the need of the second processing device 110-2 to communicate with the first processing device 110-1 altogether.

Although FIG. 3 illustrates a system 300 having two processing devices 110, other embodiments can include more processing devices 110. Each additional processing device 110 can include NGD hardware 320 and satellite software 310 to access the data bus and communicate with components 140 and other processing devices 110. Such a configuration would enable each processing device 110 to access the first processing device 110-1 to perform manager functions, such as setup data channels, as described above. Thus, the techniques above can be extrapolated to include systems with a multiplicity of processing devices 110. Any number of processing devices 110 connected with the data bus through NGD hardware 320 therefore can be configured to communicate with each other, as well as components 140 connected with the data bus, using the messaging capabilities of the data bus.

Figure 4:
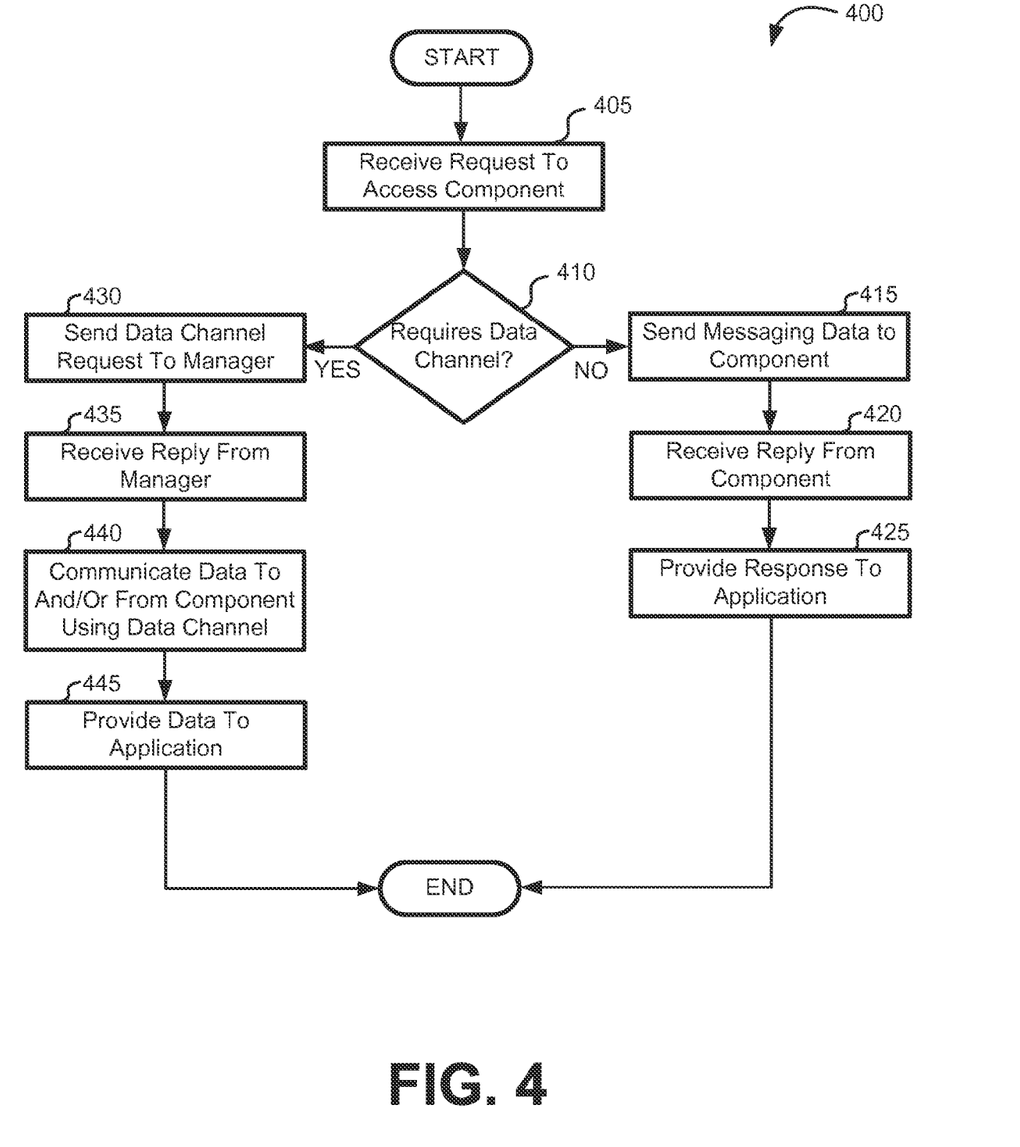
FIG. 4 is a block flow diagram illustrating an embodiment of a process of providing access to a component on the data bus utilizing NGD hardware.

Turning to FIG. 4, with further reference to FIGS. 1-3, a simplified process 400 of providing a client application 230-2 access to a component 140 on the data bus by using NGD hardware 320 is shown. The process 400 is, however, an example only and not limiting. The process 400 can be altered, e.g., by having blocks added, removed, rearranged, combined, and/or performed concurrently. Still other alterations to the process 400 as shown and described are possible.

The process 400, which can be executed in software (or other instructions stored on a computer-readable medium) by a processing device 110 connected with NGD hardware 320, can begin at block 405, where a request to access a component 140 is received. As discussed above, such a request may be communicated to satellite software 310 from a client application 230. Moreover, the request may not explicitly call for access to the component 140, but may be interpreted by the satellite software 310 as requiring such access. At block 410, it is determined whether a data channel is required. In other words, it is determined whether or not the manager 116 must be consulted. The satellite software 310 may make the determination based on the request and the known specifications of the data bus.

If no data channel is required, messaging data is sent via the NGD hardware 320 to the component 140 at block 415. And at block 420, a corresponding reply is received. As discussed above, such a reply could include an acknowledgement of register values being changed and/or a reading of register values, among other things. Finally, at block 425, a corresponding response is provided to the application that made the request.

If, on the other hand, the request received by the client application (or other requesting entity) requires a data channel, a corresponding request is made to the manager 116. The request is sent using the NGD hardware 320, via a messaging channel on the data bus, to the manager 116, which may be associated with a processing device 110. The request can include a variety of information indicating the requested component, desired bandwidth, length of time for data transfer and/or amount of data to transfer, and more. Once the manager 116 allocates a corresponding data channel, the reply and/or acknowledgement from the manager 116 is received, at block 435.

With the data channel allocated, data is communicated to and/or from the corresponding component 140 via the data channel on the data bus. As indicated above, because the NGD hardware 320 may not have data transfer capabilities, such communication may be enabled by utilizing separate data transfer hardware. At block 445, corresponding data is provided to the application. Such data could include an acknowledgement of a successful data transfer, and/or data communicated from the component 140, among other things.

Figure 5:
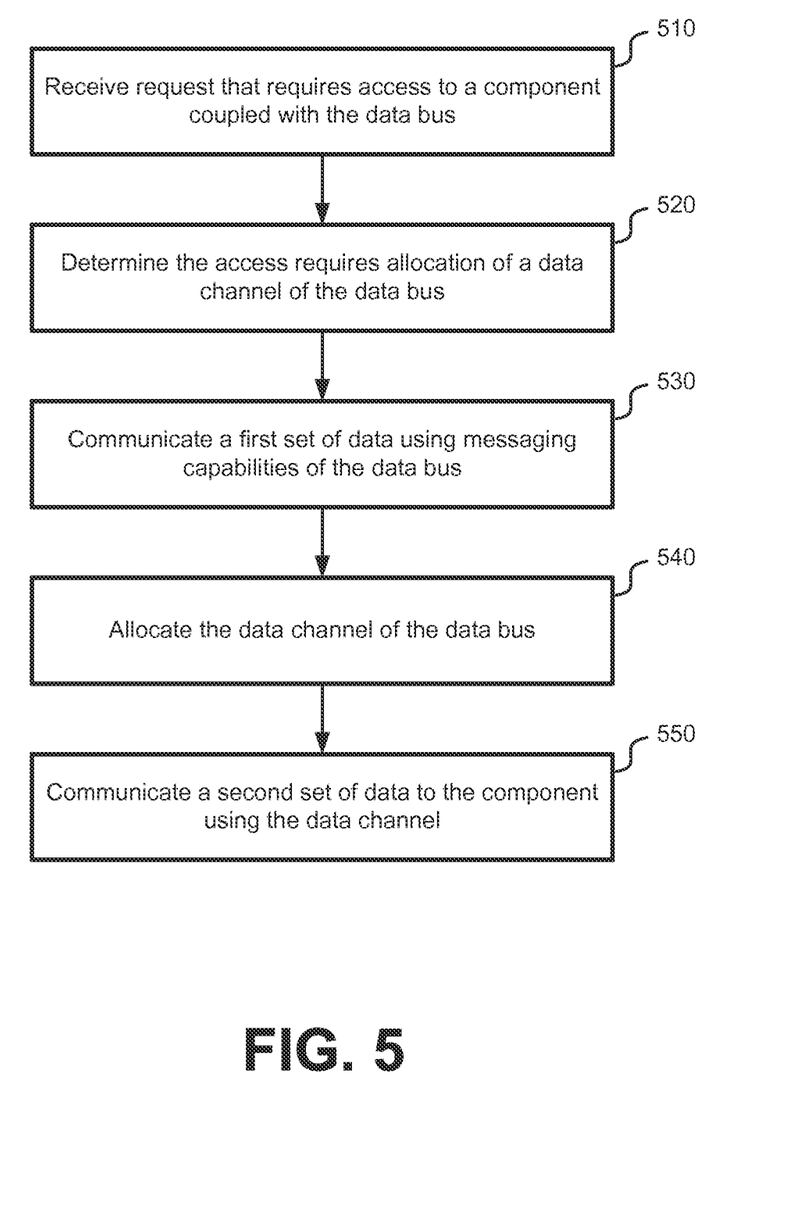
FIG. 5 is a simplified flowchart illustrating a method for communicating information on a data bus using a communication device without a port on the data bus, according to one embodiment of the present invention.

FIG. 5 is a simplified flowchart illustrating a method for communicating information on a data bus, such as a SLIMbus, using a communication device without a port on the data bus (e.g., NGD hardware 320), according to one embodiment of the present invention. The method that can be performed, for example, using various components of the system 300 of FIG. 3, such as processing devices 110, NGD hardware 320, satellite software 310, manager hardware 116, and/or manager software 217.

Referring to FIG. 5, a request that requires access to a component 140 coupled with the data bus is received, at block 510. Such a request could be made, for example, by a client application 230-2 to a processing device 110-2 executing satellite software 310, a specialized circuit (e.g., Application-Specific Integrated Circuit (ASIC)), a hardware and/or software component of a larger system, or similar means. Furthermore, the requested access could include access to be able to stream data to and/or from the component 140. The method also includes, at block 520, determining the access requires allocation of a data channel of the data bus. As discussed herein, the data bus can provide for numerous data channels, that can be allocated on the bus using TDM techniques, as provided through manager software 217 and/or manager hardware 216. The determination that the access requires allocation of a data channel may be made by the component receiving the request (e.g. processing device 110), based on, any of numerous factors, such as the type, size, timing, and/or origin of the request.

The method further includes, at block 530, communicating a first set of data using messaging capabilities of the data bus.

Such communication can be made, for example, by a first processing device 110-2 using NGD hardware 320, ASIC, hardware and/or software component, or other non-ported communication means to a second processing device 110-1 with manager hardware 216 and/or manager software 217 via the data bus. The first set of data can include any of a variety of information, which can be used to allocate a data channel for subsequent communication between the component 140 and the processing device 110 via the data bus. Accordingly, the first set of data can include, for example, the identity of the component 140, a requested bandwidth, an amount of data (estimated or actual) to be communicated, a requested time period for the communication, and/or other pertinent information. According to some embodiments, a processing device 110-2 can use the NGD hardware 320 and satellite software 310 to access and send messages on a messaging channel of the data bus. This can include accessing otherwise unused portions of a channel allocated for messaging, thereby increasing the usage and efficiency of the messaging channel.

Continuing with the method of FIG. 5, at block 540, a data channel of the data bus is allocated. Such an allocation can be made by manager hardware 116, manager software 217, and/or other means for managing data channels of the data bas between the component 140 and the processing device 110-2 coupled to the NGD hardware 320. As stated previously, because the NGD hardware 320 may not have data transfer capabilities, the data channel may be setup such that data is communicated between the component 140 and data transfer hardware of the processing device 110-2 separate from the NGD hardware 320.

Finally, at block 550, a second set of data is communicated to the component using the data channel. The second set of data, which can be communicated by the processing device 110-2 through data transfer hardware and/or other data communication means to the component once the data channel is allocated, can include any of a variety of information depending on the desired functionality and original data transfer request. Optionally a third set of data can be communicated using the data channel, from the component 140 to the processing device 110-2, communicating, for example, an acknowledgement to the processing device 110-2. Various other types of data can be transferred between the component 140 and processing device 110-2 (or other requesting entity) as dictated by the functionality of the system, bandwidth of the data channel, and/or similar considerations.

It should be appreciated that the specific blocks illustrated in FIG. 5 provide a particular method of utilizing a communication device not having a port on the data bus (e.g., NGD hardware 320). Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 6:
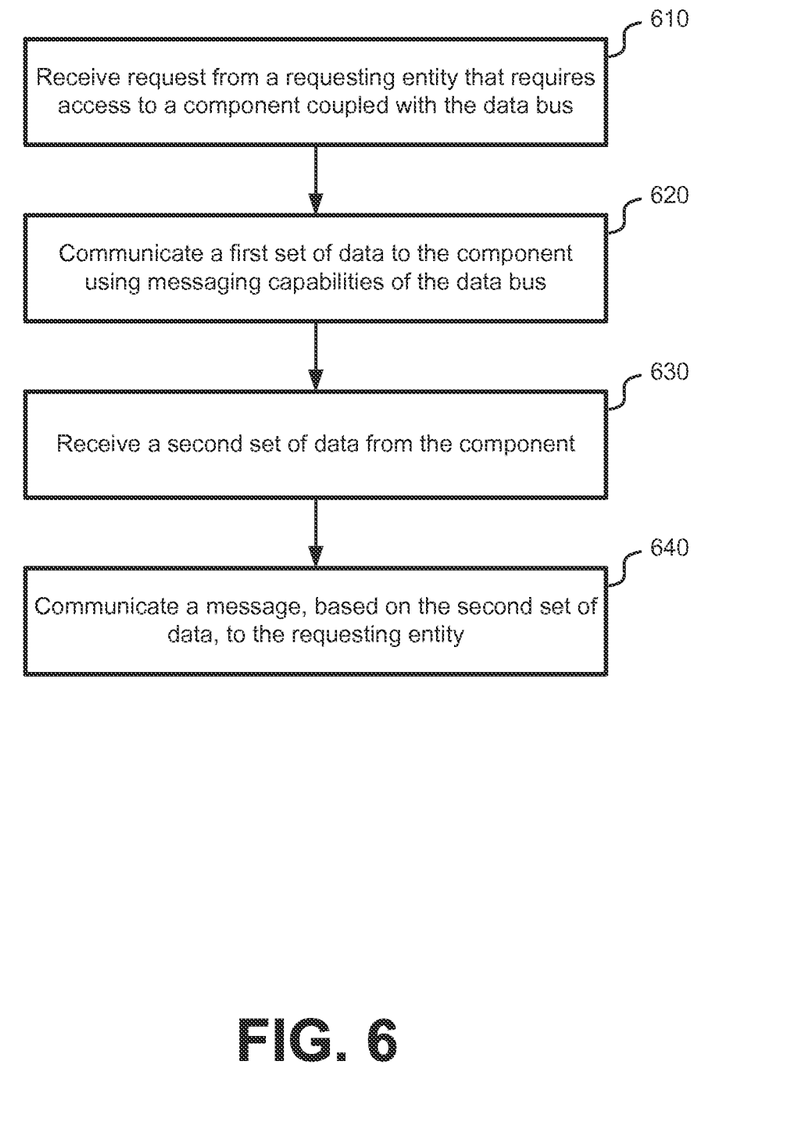
FIG. 6 is a simplified flowchart illustrating a method for communicating information on a data bus using a communication device without a port on the data bus, according to another embodiment of the present invention.

FIG. 6 is a simplified flowchart illustrating a method for communicating information on a data bus, such as a SLIM-bus, using a communication device without a port on the data bus (e.g., NGD hardware 320), according to another embodiment of the present invention. The method that can be performed, for example, using such as a processing device 110 with NGD hardware 320 and satellite software 310.

The method can begin at block 610, where a request that requires access to a component 140 coupled with the data bus is received. Similar to the method of FIG. 5, such a request could be made, for example, by a client application 230-2 to a processing device 110-2 using satellite software 310 or similar means, as described in relation to FIG. 5. Here, however, the request may be different. Rather than a request for access to a component 140 that requires the allocation of a data channel, the request may be to access the component directly.

At block 620, a first set of data is communicated by the NGD hardware 320 or similar non-ported communication means to the component 140 using messaging capabilities of the data bus. Where a data channel is not needed, the first set of data in this embodiment may be different than the first set of data as described in relation to the method of FIG. 5. For example, rather than including data that can be used to setup a data channel, the data of the first set of data can include a request to determine a value of a register of the device, or information indicative of a value to write to a register of the component 140, including an indication of the register and/or the register value. In return, a second set of data is received from the component 140, at block 630, using the NGD hardware 320 or similar means for receiving the data. The second set of data could be, for example, the value of a register of the component 140 and/or an indication that a value has been successfully written to a register of the component 140.

Finally, at block 640, a message is communicated to the requesting entity, using the satellite software 310, ASIC, software and/or hardware, or other such means based on the second set of data. For example, the requesting entity may be a client application 230-2 requesting to read a register value of a component 140 on the data bus. After satellite software 310 executed by a processing device 110-2 receives the request, it can use NGD hardware 320 to communicate to the desired component 140 using messaging channels of the data bus. The component 140 can return the register value, and the satellite software 310 can relay the value, and/or a message based on the value, to the client application 230-2.

It should be appreciated that the specific blocks illustrated in FIG. 6 provide a particular method of utilizing a communication device not having a port on the data bus (e.g., NGD hardware 320). Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Although the disclosure above discusses systems and techniques using NGD hardware, other communication devices can be used similarly. Such communication devices may not have ports, thereby simplifying the required hardware. Additionally or alternatively, such communications devices may not include framer and/or manager capabilities, which can simplify hardware even further. These simplifications in hardware also can result in relatively low costs.

Still other techniques are possible.

What is claimed is:
1. A system comprising:
   a data bus configured to provide:
      data communication through a plurality of ports, and
      message capabilities;
   a manager coupled with the data bus and configured to manage the data bus;

a first processing device coupled with the manager;
a second processing device; and
a communication device coupled with the second processing device and the data bus, wherein:
the communication device does not include a port of the data bus; and
the communication device is configured to communicate information, from the second processing device, using the message capabilities of the data bus.

2. The system of claim 1, wherein the communication device is configured to communicate with the first processing device using the message capabilities of the data bus.

3. The system of claim 1, further comprising at least one component coupled with the data bus.

4. The system of claim 3, wherein the communication device is configured to communicate with the at least one component using the message capabilities of the data bus.

5. The system of claim 4, wherein the communication device is configured write to a register of the at least one component using the message capabilities of the data bus.

6. The system of claim 4, wherein the communication device is configured read from a register of the at least one component using the message capabilities of the data bus.

7. The system of claim 3, wherein the communication device is configured to communicate a request for a data channel to the manager using the message capabilities of the data bus.

8. The system of claim 1, wherein the data bus comprises a SLIMbus.

9. The system of claim 1, wherein the communication device comprises a non-ported generic device.

10. The system of claim 1, wherein the communication device comprises a first communication device, the system further comprising a second communication device coupled between the data bus and a third processing device, wherein the second communication device is configured to communicate information, from the third processing device, using the message capabilities of the data bus.

11. A method comprising:
receiving a request that requires access to a component coupled with a data bus;
determining the access to the data bus requires allocation of a data channel of the data bus;
communicating, with a communication device not having a port on the data bus, a first set of data, wherein the first set of data is communicated using messaging capabilities of the data bus;
allocating the data channel of the data bus; and
communicating a second set of data to the component, wherein the second set of data is communicated using the data channel of the data bus.

12. The method of claim 11, wherein the data bus comprises a SLIMbus.

13. The method of claim 11, wherein the first set of data includes data indicative of an identity of the component.

14. The method of claim 11, wherein the first set of data includes data indicative of a requested bandwidth.

15. The method of claim 11, further comprising receiving, from the component, a third set of data wherein the third set of data is communicated using the data channel of the data bus.

16. The method of claim 15, further communicating the third set of data to a requesting entity.

17. The method of claim 15, further communicating an acknowledgement to a requesting entity.

18. The method of claim 11, wherein the communication device is a non-ported generic device.

19. A method comprising:
receiving a request from a requesting entity, wherein the request requires access to a component coupled with a data bus;
communicating, with a communication device not having a port on the data bus, a first set of data to the component, wherein the first set of data is communicated using messaging capabilities of the data bus;
receiving, with the communication device, a second set of data from the component; and
communicating a message to the requesting entity, wherein the message is based, at least in part, on the second set of data.

20. The method of claim 19, wherein the first set of data includes information indicative of a value to write to a register of the component.

21. The method of claim 19, wherein the second set of data includes information indicative of a value of a register of the component.

22. The method of claim 19, wherein the communication device comprises a non-ported generic device.

23. A system comprising:
a data bus configured to provide:
data communication through a plurality of ports, and
message capabilities;
a manager coupled with the data bus and configured to manage the data bus;
a first processing device coupled with a first communication device; and
a second processing device coupled with a second communication device;
wherein:
the first communication device and the second communication device are coupled with the data bus;
the first communication device and the second communication device do not include a port of the data bus; and
the first communication device is configured to communicate information from the first processing device, using the message capabilities of the data bus, to the second processing device via the second communication device.

24. The system of claim 23, further comprising at least one component coupled with the data bus configured to receive data from the first communication device using the message capabilities of the data bus.

25. The system of claim 24, wherein the first communication device is configured write to a register of the at least one component using the message capabilities of the data bus.

26. The system of claim 24, wherein the first communication device is configured read from a register of the at least one component using the message capabilities of the data bus.

27. The system of claim 23, wherein the first communication device is configured to communicate a request for a data channel to the manager using the message capabilities of the data bus.

28. The system of claim 23, wherein the first communication device and the second communication device are a non-ported generic devices.

29. An apparatus comprising:
means for receiving a request that requires access to a component coupled with a data bus;
means for determining the access to the data bus requires allocation of a data channel of the data bus;
means for communicating, with a communication device not having a port on the data bus, a first set of data, wherein the first set of data is communicated using messaging capabilities of the data bus;

means for allocating the data channel of the data bus; and means for communicating a second set of data to the component, wherein the second set of data is communicated using the data channel of the data bus.

30. The apparatus of claim 29, wherein the data bus comprises a SLIMbus.

31. The apparatus of claim 29, wherein the means for communicating is configured to include data indicative of an identity of the component in the first set of data.

32. The apparatus of claim 29, wherein the means for communicating is configured to include data indicative of a requested bandwidth in the first set of data.

33. The apparatus of claim 29, further comprising means for receiving, from the component, a third set of data wherein the third set of data is communicated using the data channel of the data bus.

34. The apparatus of claim 33, further comprising means for communicating the third set of data to a requesting entity.

35. The apparatus of claim 33, further comprising means for communicating an acknowledgement to a requesting entity.

36. The apparatus of claim 29, wherein the communication device comprises a non-ported generic device.

37. A non-transitory computer-readable medium comprising instructions configured to cause a processor to:

receive a request that requires access to a component coupled with a data bus;

determine the access to the data bus requires allocation of a data channel of the data bus;

communicate, with a communication device not having a port on the data bus, a first set of data, wherein the first set of data is communicated using messaging capabilities of the data bus;

allocate the data channel of the data bus; and communicate a second set of data to the component, wherein the second set of data is communicated using the data channel of the data bus.

38. The non-transitory computer-readable medium of claim 37, wherein the data bus comprises a SLIMbus.

39. The non-transitory computer-readable medium of claim 37, wherein the instructions are configured to cause the processor to include data indicative of an identity of the component in the first set of data.

40. The non-transitory computer-readable medium of claim 37, wherein the instructions are configured to cause the processor to include data indicative of a requested bandwidth in the first set of data.

41. The non-transitory computer-readable medium of claim 37, further comprising instructions configured to cause the processor to be able to receive, from the component via the data channel of the data bus, a third set of data.

42. The non-transitory computer-readable medium of claim 41, further comprising instructions configured to cause the processor to communicate the third set of data to a requesting entity.

43. The non-transitory computer-readable medium of claim 41, comprising instructions configured to cause the processor to communicate an acknowledgement to a requesting entity.

44. The non-transitory computer-readable medium of claim 37, wherein the communication device is a non-ported generic device.

45. A non-transitory computer-readable medium comprising instructions configured to cause a processor to:

receive a request from a requesting entity, wherein the request requires access to a component coupled with a data bus;

communicate, with a communication device not having a port on the data bus, a first set of data to the component, wherein the first set of data is communicated using messaging capabilities of the data bus;

receive, with the communication device, a second set of data from the component; and communicate a message to the requesting entity, wherein the message is based, at least in part, on the second set of data.

46. The non-transitory computer-readable medium of claim 45, wherein the instructions are configured to cause the processor to include, in the first set of data, information indicative of a value to write to a register of the component.

47. The non-transitory computer-readable medium of claim 45, the instructions are configured to cause the processor to determine, from the second set of data, information indicative of a value of a register of the component.

48. The non-transitory computer-readable medium of claim 45, wherein the communication device comprises a non-ported generic device.

* * * * *